United States Patent [19]

Bahder et al.

[11] 3,846,578

[45] Nov. 5, 1974

[54] SPLICE FOR ELECTRIC CABLES

[75] Inventors: George Bahder, Suffern; Felipe G. Garcia, New City, both of N.Y.

[73] Assignee: Phelps Dodge Industries, Inc., New York, N.Y.

[22] Filed: Mar. 22, 1972

[21] Appl. No.: 237,018

[52] U.S. Cl. ............................ 174/88 R, 174/76
[51] Int. Cl. .................................. H02g 15/08
[58] Field of Search .......... 174/84 R, 88 R, 76; 156/48, 49; 29/628

[56] References Cited
UNITED STATES PATENTS

| | | | |
|---|---|---|---|
| 2,312,652 | 3/1943 | Komives et al. | 174/88 R X |
| 2,463,231 | 3/1949 | Wyatt | 174/84 R UX |
| 3,141,060 | 7/1964 | Norton | 174/88 X |
| 3,145,421 | 8/1964 | Colbert | 174/76 UX |
| 3,356,788 | 12/1967 | Callahan et al. | 174/88 R UX |

*Primary Examiner*—J. V. Truhe
*Assistant Examiner*—D. A. Tone
*Attorney, Agent, or Firm*—Cyrus S. Hapgood

[57] ABSTRACT

The central conductors of aligned cables are provided with a mechanical and electrical interconnection at their opposing end portions where their respective insulating layers are cut back to expose these end portions. An insulating sleeve is applied in surrounding relation to the adjacent end portions of the cable to form a chamber extending around said interconnection and the respective cut-back insulating layers, the chamber being closed except for an inlet and an outlet. A filling material having a high dielectric constant is injected through said inlet while expelling air through said outlet until the chamber is substantially filled with the material, whereupon the outlet is closed and an additional amount of said material is forced through the inlet to place the chamber contents under superatmospheric pressure. The inlet is then closed to maintain the filling material under superatmospheric pressure in the chamber.

8 Claims, 1 Drawing Figure

PATENTED NOV 5 1974 3,846,578
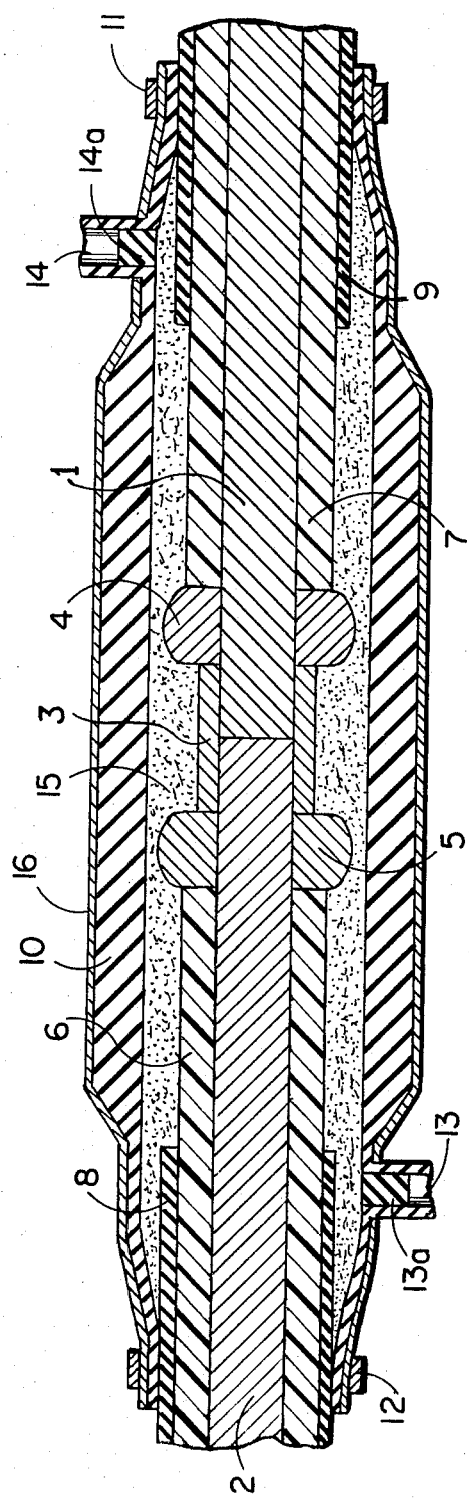

SPLICE FOR ELECTRIC CABLES

This invention relates to the splicing of high voltage electric cables and more particularly to a novel cable splice and method of making the same.

The invention is particularly useful in splicing cables of the extruded type, that is, cables in which at least the primary insulation is extruded around the central conductor. Accordingly, the invention will be described in connection with such cables, although it will be understood that it is applicable to other types of cables as well.

For splicing cables of the extruded type, various splice constructions have been used heretofore. One example is a splice comprising a self-bonding EPR insulating tape applied in the conventional manner. Such tape has high dielectric losses and relatively low breakdown voltage stress, with the result that the electrical parameters of the splice just barely meet the requirements. Moreover, application of the tape is a very tedious and time-consuming procedure requiring considerable attention from the splicer; and there is no way to assess the quality of the workmanship on each individual splice.

Another example is the type of splice which is molded in the field and which is made of materials having high electrical properties. This type of splice requires expensive and bulky molding equipment which is troublesome to use in the field. Also, experience indicates that it is difficult to obtain a high level of consistency in the quality of these splices. Consequently, there has been no substantial use of such splices.

A third example is the splice of the prefabricated slip-on type, which is relatively easy to install. However, it requires a very tight fit between the splice and the cable. Presently, splices of this type have rated voltages which are limited up to 35 kV, this being dictated mainly by their poor performance at higher voltages.

The principal object of the present invention is to provide a cable splice which overcomes the above-noted disadvantages of prior cable splices.

In preparing the new cable splice, the layer of insulation is cut back from the ends of each cable, thereby exposing the opposing end portions of the respective conductors; and these end portions are interconnected mechanically and electrically by a coupling member coaxial therewith. According to the invention, the splice comprises insulating means forming a substantially closed annular chamber extending around the coupling member and the cut-back insulating layers, such means including an insulating sleeve surrounding the coupling member and layers in spaced relation thereto. The chamber is filled with a material of high dielectric constant which is injected through an inlet of the chamber while expelling air from an outlet, the inlet and outlet being closed after completion of the filling.

Preferably, the filling material is under superatmospheric pressure; and for this purpose the air outlet from the chamber is closed when the latter has been substantially filled, and additional material is then injected through the inlet to pressurize the material, whereupon the inlet is closed to maintain the pressure.

Thus, the new splice is of simple construction and can be applied quickly, only simple tools being needed for its application. Also, the insulating elements of the splice can be pretested. Further, the splice has high dielectric strength and high corona level and can be built to whatever maximum voltage is required (even 230 kV or higher).

For a more complete understanding of the invention, reference may be had to the following detailed description in conjunction with the accompanying drawing, in which the single illustration is a longitudinal sectional view of a preferred form of the new splice.

Referring to the drawing, the two spliced cables have central conductors 1 and 2 closely surrounded by extruded insulation layers 7 and 6, respectively, which may be cross-linked polyethylene. If desired, a thin inner shielding layer (not shown) may be interposed between the conductors and their insulating layers. Surrounding the layers 6 and 7 are cable insulation shields 8 and 9, respectively, such as those commonly used for high-voltage cables.

The insulating layers 6-7 are cut back to expose the opposing end portions of the cable conductors 1-2, and these end portions are coupled together coaxially in any suitable manner so as to provide a mechanical and electrical connection between them. As shown, the coupling comprises a conventional conductor connector 3. Semiconducting cup electrodes 4 and 5 are applied around the conductors and against the cut-back ends of the cable insulation 6 and 7, respectively. The insulation shields 8 and 9 are cut back from the cut-back ends of the respective insulation layers 6 and 7 by a distance dictated by the rated voltage of the cable.

An insulating sleeve 10 is applied around the adjacent end portions of the two cables, the opposite ends of the sleeve closely surrounding the insulation shields 8 and 9, respectively, and being sealed thereto in any suitable manner, as by means of clamps 11 and 12. The sleeve 10 is in surrounding and spaced relation to the parts 3-5 and to the exposed parts of the cable insulation 6-7, thereby forming an annular chamber extending around these parts. This chamber is closed except for a filler inlet 13 and an air outlet 14.

A filler 15 having a high dielectric constant is injected into the sleeve-formed chamber through its inlet 13, the displaced air discharging through outlet 14. When the filler 15 becomes visible at the outlet 14, the latter is closed, as by means of an insulating plug 14a. Thus, continued injection of the filler creates a positive pressure between the end portions of the cables and the surrounding insulating sleeve 10. When the desired pressure is attained, the inlet 13 is closed, as by means of an insulating plug 13a, thereby maintaining the filler 15 under superatmospheric pressure. The filler is preferably a compound which not only has a high dielectric constant but which also will set or harden within a few hours after its injection into the sleeve-formed chamber.

The insulating sleeve 10 is covered with a semiconducting sleeve shield 16. If desired, a metallic shield (not shown) can be applied over the sleeve shield 16.

The insulation sleeve 10, which provides the main electrical insulation of the splice, can be made in a factory and pretested; and it has high dielectric properties, preferably the same as the insulation of the cables. The filling compound 15 transmits the electrical potential from the area of connector 3 to the insulating sleeve 10 in the radial direction and assures proper voltage distribution in the longitudinal direction. Since the dielectric constant of the filler is much higher than that of the cable insulation, the voltage stresses in the filler are extremely small as compared to the stresses in the cable insulation. Under these conditions even some defects (small voids or other specks) which may appear in the high dielectric constant filler do not have any significant effect on the performance of the splice.

It will be understood that preparation of the cable ends can be as indicated above or modified. For example, instead of using the semi-conducting cups 4 and 5, the cable insulation 6–7 can be penciled in the conventional manner so that it tapers toward the connector 3. In a case of very high voltages, additional semi-conducting cups (not shown) can be used at the cut-back ends of the cable insulation shields 8 and 9. Also, with cables of the jacketed type the sleeve 10 can be applied over the jackets instead of over the insulation shields.

The following pertains to an example of a splice made according to the invention and in which the cable insulation was penciled instead of using the cups 4–5.

For cable having an I/O conductor with crosslinked polyethylene insulation, a 35 kV splice had the following dimensions:

| | |
|---|---|
| Length of penciled insulation on each cable: | 6.5 " |
| Overall length of splice: | 25.5 " |
| Overall diameter of insulating sleeve 10: | 2.75" |
| Wall thickness of the sleeve 10: | 0.35" |

The following parameters were measured on this splice:

| | |
|---|---|
| Corona Level: | Exceeds requirements of AEIC Specification 5–69 for 35 kV polyethylene cable with extruded shields before and after 50 thermal cycles. |
| Impulse Breakdown Level: | In excess of 500 kV. |

The insulating sleeve 10 was made of EPR compound having the following formulation:

| COMPOUND | PARTS |
|---|---|
| Vistalon 404 | 100 |
| Zinc Oxide | 5 |
| Burgess KE Clay | 110 |
| SRF Black | 10 |
| Agerite Resin D | 1–5 |
| $Pb_3O_4$ | 5 |
| Tryallyl Cyanurate | 1–5 |
| D' - Cup R | 2.7 |

However, the sleeve 10 may also be made of EPR compound formulated differently or of other elastomeric type material.

The high dielectric constant compound 15 used in the above-mentioned splice was made up of:

| COMPOUND | PARTS |
|---|---|
| Hysol Polyurethane CuA-308 | 260 |
| Philblack "A" Carbon Black | 23.5 |

Any other material having dielectric constant over 10 and preferably closer to 30 and having proper flow characteristics can be used for this type of splice.

We claim:

1. In combination with a pair of axially aligned cables each having a central conductor and a surrounding insulating layer, said layers being cut back to expose opposing end portions of the conductors, a cable splice comprising a coupling member mechanically and electrically interconnecting said conductor end portions and coaxial therewith, insulating means forming a substantially closed annular chamber extending around said coupling member and insulating layers and having a filler inlet and an air outlet, said inlet and outlet being closed, said means including an insulating sleeve having integral portions surrounding said member and layers in spaced relation thereto, said sleeve having high dielectric properties and constituting the main electrical insulation of the splice, and a material of high dielectric constant filling said chamber.

2. The combination according to claim 1, in which said filling material is under superatmospheric pressure.

3. The combination according to claim 1, comprising also a shield surrounding each insulating layer and cut back to expose a part of said layer surrounded by said filling material, said sleeve having opposite end portions surrounding the respective shields in sealed relation thereto.

4. The combination according to claim 3, comprising also an additional shield surrounding said sleeve and having end portions overlapping said opposite end portions of the sleeve, and means clamping said overlapping end portions to the respective cut-back shields.

5. The combination according to claim 1, comprising also a shield surrounding said sleeve.

6. The combination according to claim 4, in which said shield is in intimate contact with the sleeve and is semi-conducting.

7. The combination according to claim 1, in which said filling material has a substantially higher dielectric constant than said insulating layers.

8. The combination according to claim 1, in which said filling material is a compound adapted to set after injection into said chamber.

* * * * *